Nov. 29, 1955     T. A. LEONARD, JR     2,725,241
WING CARRYING DEVICE FOR TRANSPORTING AIRCRAFT WINGS
Filed Feb. 28, 1952     2 Sheets-Sheet 1

INVENTOR
Talbert A. Leonard, Jr.

BY Mason, Fenwick & Lawrence
ATTORNEYS

Nov. 29, 1955  T. A. LEONARD, JR  2,725,241
WING CARRYING DEVICE FOR TRANSPORTING AIRCRAFT WINGS
Filed Feb. 28, 1952  2 Sheets-Sheet 2
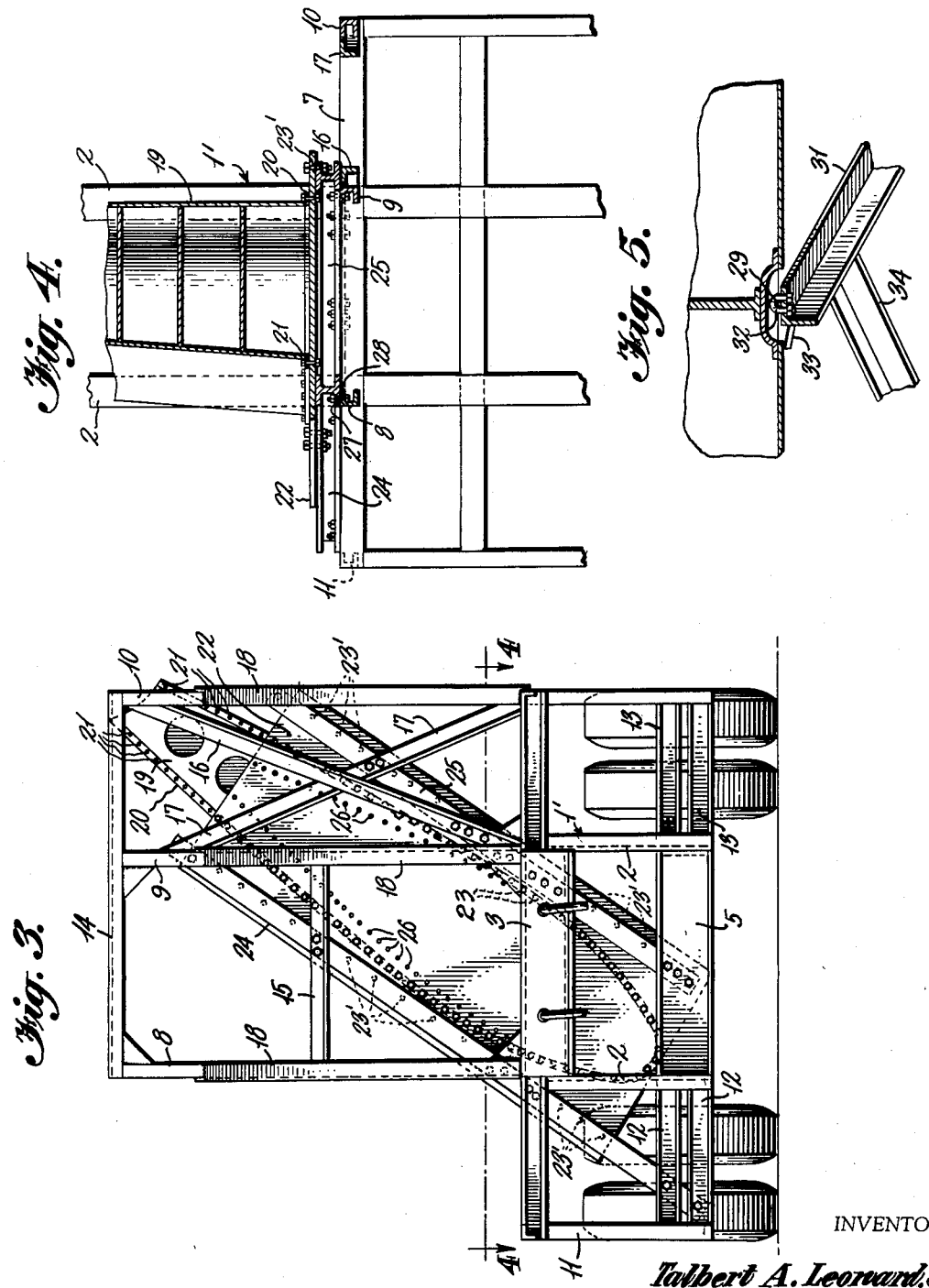
INVENTOR
*Talbert A. Leonard, Jr.*
BY *Mason, Fenwick & Lawrence*
ATTORNEYS United States Patent Office 2,725,241
Patented Nov. 29, 1955

2,725,241

WING CARRYING DEVICE FOR TRANSPORTING AIRCRAFT WINGS

Talbert A. Leonard, Jr., Miami, Fla.

Application February 28, 1952, Serial No. 273,974

4 Claims. (Cl. 280—179)

This invention relates to wing carrying devices designed to be employed in the transportation of aircraft wings, as well as other components or members, the construction of which adapts them to be similarly mounted for transportation.

In the following description of the invention an aircraft wing has been selected as an example of the thing carried. Such a wing has an outwardly extending flange at its base end, with a peripheral series of bolt holes by which the wing is bolted to the structure of the fuselage. One of the objects of the invention is to provide a stiff metal plate as an intermediary between the base of the wing and the vehicular support to which the wing is to be secured, said plate being of such size as to overlie a substantial part of the area of the wing base including the peripheral flange, and having a pattern of perforations registering with a sufficient number of existing bolt holes in said flange and so distributively located as to adequately support the wing when the latter is bolted to the plate through said registering perforations and bolt holes, the plate with wing attached being adapted to be lifted by a crane, for example, into a position against the vehicular support, and being securable in flat contiguity to said support.

Since the plate may not be absolutely rigid, so that it may warp somewhat under the weight of the wing, and as the vehicular support may not be precisely planiform, so that the plate might be distorted when bolted tight against it, it is another object of the invention to provide rigid reinforcing members secured to the plate and securable to the vehicle support.

Still another object of the invention is the provision of a vehicle having an upright support extending transversely thereof, a face of said support being planiform, said support being in combination with a plate having a pattern of perforations registrable with a plurality of existing bolt holes in the thing to be supported, adapted to be bolted thereto through said perforations and bolt holes when in registry, and spaced rigid beams secured to said plate and said planiform face of said vehicular support.

Other objects of the invention will appear as the following description of a preferred and practical embodiment thereof proceeds.

In the drawings which accompany and form a part of the following specification, and throughout the figures of which the same reference characters have been used to denote identical parts:

Figure 3 is a cross-section taken along the line 3—3 of Figure 1;

Figure 4 is a section taken along the line 4—4 of Figure 3;

Figure 5 is a section taken along the line 5—5 of Figure 1.

Figure 1:
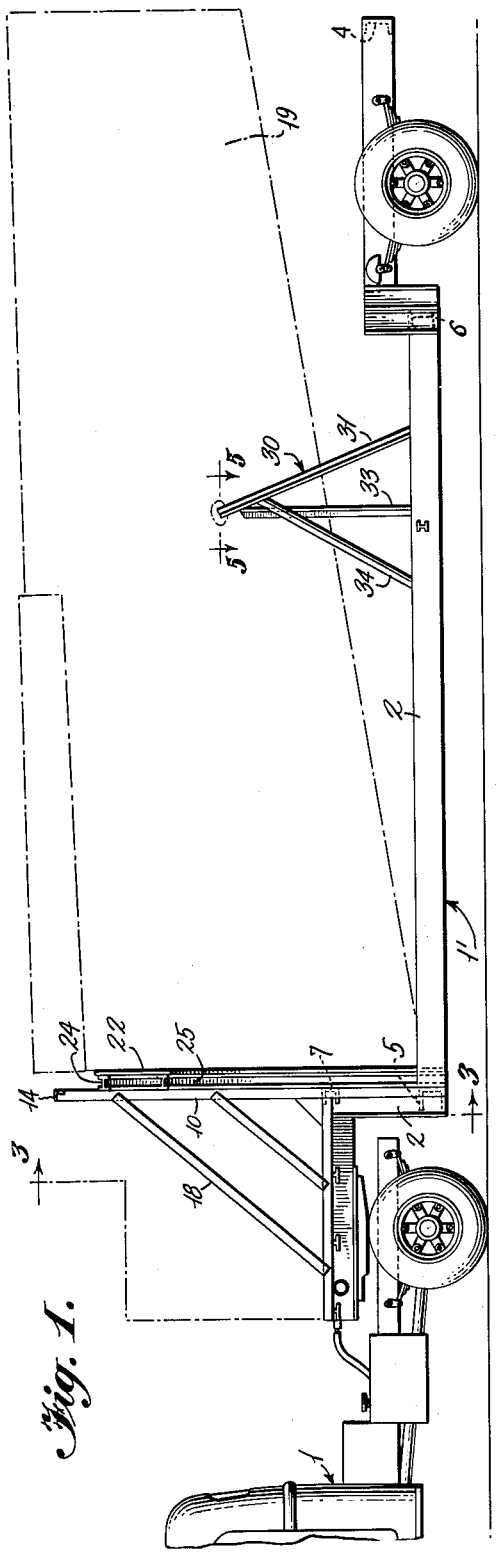
Figure 1 is a view in side elevation of a vehicle with wing carrying means embodying the principles of the invention.
Figure 2:
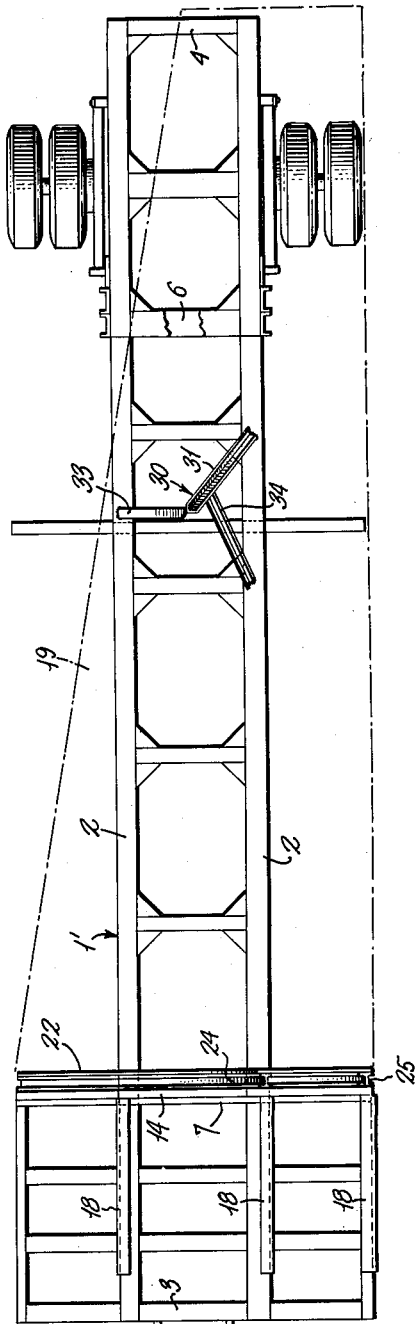
Figure 2 is a plan view.

Referring now in detail to the several figures, the numeral 1 represents a vehicle of the trailer truck type comprising a chassis 1', consisting of a rectangular frame having spaced side beams 2, and front and rear end beams 3 and 4, the side beams having a vertical dip back of the front wheels and forward of the rear wheels, whereby the intermediate part of the chassis is low slung as far as is practicable toward the ground. Cross beams 5 and 6 are provided between the side beams at the ends of the low slung portion. A transverse beam 7 extends across the chassis above the cross beam 5, its length being substantially coextensive with the width of the wheel base.

At the front of the low slung portion of the chassis a vertical frame is erected, including spaced vertical beams 8 and 9 supported upon the beam 7, these beams lying substantially in vertical longitudinal planes that embrace the side beams 2, and a vertical beam 10 which extends downward past the adjacent end of the beam 7 to a point level with the lower side of the cross beam 5. It is welded to the end of the beam 7. A short vertical beam 11 extends downwardly from the opposite end of the beam 7, terminating at the level of the under side of the cross beam 5. The lower parts of the beams 10 and 11 are connected to the adjacent vertical parts of the side members 2 by pairs of spaced transverse beams 12 and 13.

The upper ends of the beams 8, 9 and 10 terminate at the same level and are bridged and connected by a top beam 14. There is a cross brace 15 between the vertical beams 8 and 9 at an intermediate point in their height, and there are a pair of intersecting diagonal struts 16 and 17 between the vertical beams 9 and 10 above the beam 7, the strut 17 being divided and welded to the strut 16 in such manner that the face flanges of said struts are in the same plane.

All of the beams constituting the frame as shown, are of channel cross-section except the cross brace 15 and the diagonal struts, which are angle bars. The vertical beams 8, 9 and 10 are supported by suitable braces 18 fixed thereto near their upper ends, and to the chassis members forward of the supporting frame.

The frame construction as described, is specific to the particular trailer truck selected by way of example for illustrating the invention. The specific construction of the supporting frame is not important to the invention, the only essential being that the faces of the frame members against which the wing or other object is to be fixed shall lie in a single plane. In the construction shown, the rear faces of the beams 7, 8, 9, 10, 11, 12, 13 and 14 and the rear faces of the vertical portions of the side members 2 and of the cross beam 5, as well as the rear faces of the cross brace 15 and struts 16 and 17, are all in the same vertical plane.

The wing 19, shown in the drawing, is of such width that it might occupy more than one-half the roadway if laid flat, and it might afford insufficient clearance with respect to under passes or low strung overhead wires if carried vertical, so the practical way to carry it is in a transversely inclined position as shown. This accounts for the shape of the peripheral outline of the supporting frame.

The base of the wing 19 has an extended peripheral flange 20, having a series of bolt holes 21 therethrough for bolting it to the structure of the fuselage. This peripheral flange is employed in carrying out the functions of the present invention. A flat plate 22 is provided of sufficient thickness, say one-half inch, to be substantially rigid, and of sufficient extent to overlie a substantial portion of the area of the base of the wing, including the peripheral flange 20, to adequately support the wing when the latter is bolted to it. The plate is of such width as to extend beyond the base of the wing on both sides.

The plate has a pattern of perforations 23 therethrough, corresponding to a plurality of bolt holes 21 in the flange 20, and registrable therewith when the plate is properly positioned in surface contact with the base flange of the wing. The plate is tightly bolted to the wing through the registering perforations and bolt holes.

The plate has a plurality of additional perforations 23', spaced longitudinally of the plate on each side, outside of the said pattern of perforations, said additional perforations affording means by which the I-beams 24 and 25 may be bolted to the plate, preferably parallel to one another. One or both of the I-beams may, if necessary, extend beyond the ends of the plate, as shown in Figure 3. The I-beams, if desired, may be permanently secured to the plate. It is generally preferable, however, to have the I-beams detachable from the plate, since the invention contemplates that several plates may be on hand, conveniently stacked, each having a different pattern of perforations to correspond to the arrangement of bolt holes on different types of wing base or on other objects to be transported, such for example as a fuselage cone. A single plate may, however, be provided with more than one pattern of perforations. The plate 22, shown in Figure 3, has an alternative pattern of perforations 26, adapting it for use with a different wing from the one shown.

The I-beams 24 and 25 are provided with additional bolt holes 27 at points at which the I-beams contact the members of the supporting frame, and said members are provided with bolt holes 28 registrable with the bolt holes 27, enabling the I-beams to be fixed to the supporting frame. Thus, as seen in Figure 3, the lefthand I-beam 24 is secured to the beams 9, 5, 7, and 12, and the brace 15, of the supporting frame, while the righthand I-beam 25 is secured to the beams 10, 9, 7, 5, and the struts 16 and 17.

In mounting the wing for transportation, according to the invention, the plate having the proper pattern of perforations is selected and bolted to the base of the wing, in the manner set forth. The two I-beams are then bolted to the plate. A crane then lifts the wing, together with the plate, and positions the latter in face contact with the flush faces of the supporting frame, holding it there until the I-beams have been bolted to the supporting frame. The purpose of the I-beams is as suggested in the statement of the objects of the invention, to make the plate completely rigid, and to compensate for any lack of precision in the planiform relationship of the cooperating faces of the supporting frame members.

Practically all wings are provided at an intermediate point in their length with an eye or its equivalent, for engagement by a crane hook, so that the wing may be suspended in the course of its installation in or removal from the aircraft. Figure 5, at 29 shows a ring of this character. The present invention contemplates the use of a tripod 30 for supporting the wing at an intermediate point, the tripod shown having a leg 31 with a U-bolt 32 at its upper end, which can be engaged with the ring 29 while the wing is still crane suspended after it has been fixed at its base to the supporting frame. The foot of the leg 31 is then welded to one of the side beams 2 of the chassis. The other legs 32 and 34 are then welded to the leg 31 and to the opposite side chassis beams 2. When the wing has been released from the crane, it is now immovably supported at its base and also supported intermediately. It is now ready for transportation. Later, after the wing has been delivered, the welded connections of the tripod can be cut apart by a torch.

The system of wing transportation which constitutes the present invention relieves the wing from any strains which it is not constructed to resist, since it is supported by the base flange which is designed to carry the weight of the fuselage. The wing is carried in an absolutely immovable position at an optimum angle to the width of the road in such a manner that it cannot shift its position, and no part of the wing rests upon the skin surface which could be readily damaged.

While I have in the above description disclosed what I believe to be a preferred and practical embodiment of the invention, it will be understood by those skilled in the art that the details of construction and arrangement of parts, as shown, are by way of example and not to be construed as limiting the scope of the invention.

What I claim is:

1. Apparatus for carrying an aircraft wing or other objects having a preformed pattern of bolt holes opening in a planiform surface, comprising a planiform plate having a pattern of perforations corresponding to a plurality of bolt holes in said preformed pattern of the thing to be carried to register therewith when said plate is placed in adjusted contiguity with said surface, said plate and the thing to be carried being secured together by bolts through said registering perforations and bolt holes, a support mounted on a vehicle having an upright planiform face, linear reinforcing members at opposite sides of said plate between said plate and the planiform face of said support, secured to said plate and adapted, unitarily with said plate and the thing to be carried, to be secured against the planiform face of said support.

2. Apparatus as claimed in claim 1, said reinforcing members and said plate having registering bolt holes permitting said members to be detachably secured to said plate.

3. Apparatus for carrying an aircraft wing or other object having a preformed pattern of bolt holes opening in a planiform surface, comprising a planiform plate having a pattern of perforations corresponding to a plurality of bolt holes in said preformed pattern of the thing to be carried to register therewith when said plate is placed in adjusted contiguity with said surface, said plate and the thing to be carried being secured together by bolts through said registering perforations and bolt holes, a support mounted on a vehicle, comprising an open frame consisting of connected beams presenting a face of each in a common upright plane, linear reinforcing members at opposite sides of said plate between said plate and the common upright plane of said support, secured to said plate and, unitarily with said plate and the thing to be carried, lying against said frame in said common plane, intersecting a plurality of said beams and being secured thereto at their points of intersection.

4. Apparatus for carrying an aircraft wing or other objects having a preformed pattern of bolt holes opening in a planiform surface, comprising a planiform plate having a pattern of perforations corresponding to a plurality of bolt holes in the said preformed pattern of the thing to be carried, to register therewith when said plate is placed in adjusted contiguity with said surface, said plate and the thing to be carried being secured together by bolts through said registering perforations and bolt holes, in combination with a support mounted on a vehicle, said support having an upright planiform face, and reinforcing beams for said plate forming an intermediary between said plate and the planiform face of said support, detachably securable to said plate by bolt holes in said plate extraneous to said preformed pattern, and registering bolt holes in said beams, and being detachably securable to said support through registering holes in said beams and said support.

References Cited in the file of this patent

UNITED STATES PATENTS

| 1,347,960 | Michod | July 27, 1920 |
| 1,504,751 | Green | Aug. 12, 1924 |
| 2,391,363 | Stuart | Dec. 18, 1945 |
| 2,460,797 | Allington | Feb. 8, 1949 |